United States Patent [19]

Koch

[11] 4,219,202
[45] Aug. 26, 1980

[54] AXIAL MECHANICAL SEAL

[75] Inventor: Rudolf Koch, Beaconsfield, Canada

[73] Assignee: Tyton Seal, Inc., Pointe Claire, Canada

[21] Appl. No.: 37,216

[22] Filed: May 8, 1979

[51] Int. Cl.² .............................................. F16J 15/34
[52] U.S. Cl. .................................. 277/93 SD; 277/27; 277/28
[58] Field of Search ............... 277/81 R, 82, 85, 93 R, 277/93 SD, 20, 40, 41, 17, 19, 3, 27, 28

[56] References Cited

U.S. PATENT DOCUMENTS

| 2,667,348 | 1/1954 | Frye et al. | 277/17 X |
| 3,540,741 | 11/1970 | LeFebvre | 277/28 |
| 3,578,341 | 5/1971 | LeFebvre | 277/3 |
| 3,894,741 | 7/1975 | McHugh | 277/67 X |

FOREIGN PATENT DOCUMENTS

| 409600 | 5/1934 | United Kingdom | 277/81 R |
| 851947 | 10/1960 | United Kingdom | 277/3 |

Primary Examiner—Robert S. Ward, Jr.
Attorney, Agent, or Firm—Cushman, Darby & Cushman

[57] ABSTRACT

The axial mechanical seal of the present invention comprises a housing with an enclosed annular space containing fluid under pressure; a seal ring and a carrier supporting the seal ring are axially and radially displaceable in the annular space when subjected to heavy vibrations; a series of pockets are annularly disposed in the housing and each includes a compensating element having a portion in contact with the fluid under pressure that yields to accept the fluid displacement resulting from the axial movement of the seal ring and its carrier inside the annular space.

18 Claims, 9 Drawing Figures

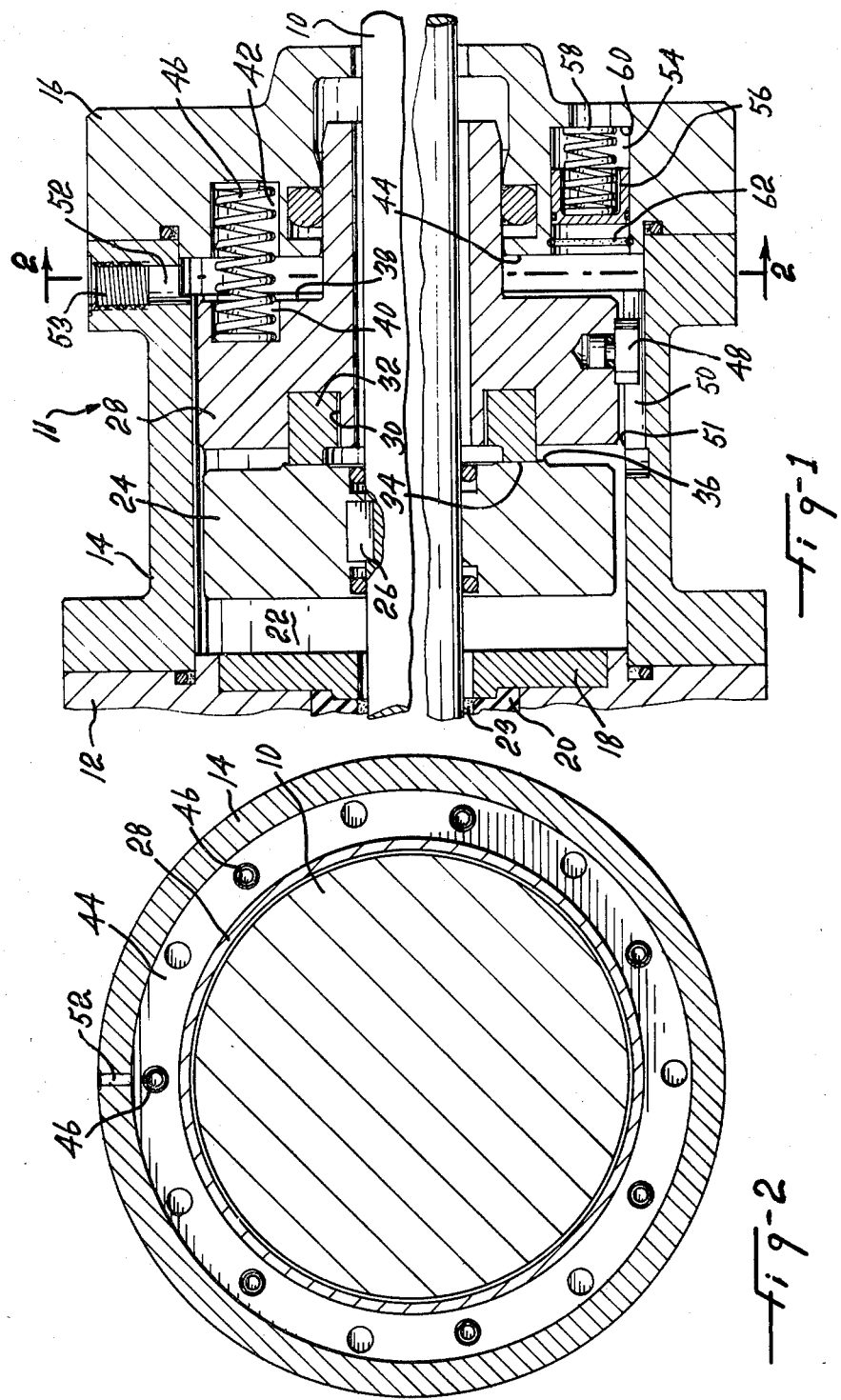

AXIAL MECHANICAL SEAL

FIELD OF THE INVENTION

The present invention relates to axial mechanical seals, and more particularly to seals used in apparatus subjected to heavy vibrations.

BACKGROUND OF THE INVENTION

Basically, an axial mechanical seal includes a pair of flat sealing faces forming part of a rotating seat ring and a stationary sealing ring; these flat faces are urged into fluid sealing engagement with one another by the application of force (usually springs) to one or both of them. In addition, these faces are subjected to the pressurized fluid contained within a portion of the seal housing into which a rotatable shaft extends.

Vibrations which are transmitted from the machine to the seal cause difficulties, especially in large units such as turbines, sterntubes, etc. Depending on the frequency and the amplitude of these vibrations, there occurs periodical lift-off of the sealing faces resulting in significant leakage therebetween. In extreme cases, this effect can cause very short suction and discharge periods in the sealing gap with high speed leakage flow and extreme high pressure differences leading to erosion of the sealing surfaces and rapid damage of the seal. These vibrations may be divided into radial and axial movements. Radial movements lead to the sliding of the sealing ring and the seat ring in the radial direction of the faces of each other; however, these movements are, in most cases, accepted by standard axial mechanical seals. On the other hand, axial movements generate forces in the area of the seals which may be divided into mass forces and hydraulic forces. In order to reduce mass forces, parts subject to such forces are usually made as light as possible. Also, by adjusting the load of the springs urging the faces in contact with one another, the area of resonance can be avoided.

The hydraulic forces are significantly larger than the mass forces as considerable amounts of fluid must be displaced and suctioned within very short time intervals. Because of the above-mentioned periodical lift-off, these hydraulic forces may lead to a constant opening of the seal faces as the forces in the springs are not capable of restoring the contact of the sealing faces in the short time intervals. This condition leads to a constant and very high leakage, eliminating the advantage of low leakage and high life expectancy of axial mechanical seals as compared to other types of seals.

OBJECT AND STATEMENT OF THE INVENTION

It is therefore an object of this invention to provide a seal which is capable of tolerating vibrations without the aforementioned negative effects.

Basically, the present invention provides compensators in the housing of an axial mechanical seal, which compensators are capable of accepting the displaced fluid without high flow velocity and forces and of disposing of this fluid according to frequency.

The present invention therefore provides a series of pockets annularly disposed in the housing an axial mechanical seal and of compensator means in each of these pockets. The compensator means consist of resilient means having a portion in contact with the fluid under pressure and yielding in the pockets to accept the fluid displacement caused by the axial movement of the seal ring and the seal ring carrier means when they are subject to high vibrations.

The scope of applicability of the present invention will become apparent from the detailed description given hereinafter; it should be understood, however, that the detailed description, while indicating preferred embodiments of the invention, is given by way of illustration only since various changes and modifications within the spirit and scope of the invention will become apparent to those skilled in the art.

IN THE DRAWINGS

FIG. 1 is a cross-sectional view of an axial mechanical seal made in accordance with the present invention;

FIG. 2 is an enlarged cross-sectional view taken along lines 2—2 of FIG. 1; and

Figure 3:
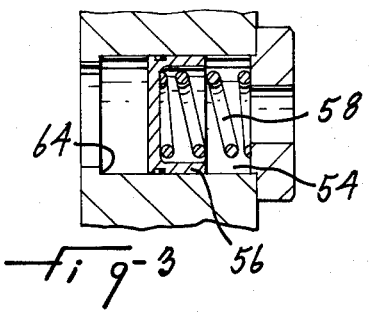
FIGS. 3–9 show enlarged sectional views of various compensator means made in accordance with the present invention.

Referring to FIGS. 1 and 2 of the drawings, there is shown part of an axial mechanical seal which, for example, could be inserted inside the housing of a sterntube of a ship or to a water turbine, which applications involve heavy vibrations in operation. A rotatable shaft 10 extends through the seal housing, generally denoted as 11, and consisting of a base ring 12, a main housing portion 14 and a cover 16. An annular clamp member 18 coaxially mounted to shaft 10 secures an inflatable seal 20 (partly shown in FIG. 1) which is used for maintenance and replacement purposes. The base ring 12, the main housing portion 14 and the cover 16 define therein an enclosed annular chamber 22 which is opened to pressurized fluid through inlet 23. In chamber 22, a rotatable seat ring 24 is keyed at 26 and coaxially mounted to the rotatable shaft 10. Also received in annular chamber 22, a stationary carrier ring 28 is coaxially mounted to shaft 10 and is provided with an annular recess 30 in which is received a seal ring 32 having a flat face 34 in frictional sealing contact with a flat face 36 provided on one side of the seat ring 24. These sealing faces are substantially normal to the shaft axis 10. The seal ring 32 may consist of a carbon element.

Face 38 of carrier ring 28 opposite to the face in which the seal ring is mounted, includes a series of annularly disposed pockets 40 which are axially aligned with a first set of similar shaped pockets 42, also annularly provided on the inner face 44 of cover 16. The aligned pockets 40 and 42 each contains a relatively weak compression spring 46 which serves to exert a compressive force on the carrier ring 28 to thereby maintain contact between the sealing faces 34 and 36.

Carrier ring 28 is stationary and is held against rotation by a series of a stopping element 48 which are circumferentially mounted on the carrier ring 28 and which are shaped to fit into longitudinal slots 50 extending in the interior wall 51 of housing portion 14.

An outlet passageway, in fluid connection with annular space 22 has a threaded portion 53 for proper connection with a conduit (not shown) adapted to be connected to a compensating chamber for taking up small pressure variation in the fluid. However, it has been mentioned above that vibrations in large units, such as turbines, sterntubes and the like, cause sealing difficulties. The hydraulic forces resulting from these vibrations are significantly large as considerable amounts of fluid must be displaced and suctioned within very short time intervals and this result in life-off in the sealing region of faces 34 and 35 causing leakage. The present invention is concerned with the provision of compensators which are capable of accepting the displaced fluid without high flow velocity and forces and of disposing of this fluid according to the frequency.

In the embodiment illustrated in FIGS. 1 and 2, these compensator means consist of a second series of annularly disposed pockets 54 in interior 44 of the cover. A piston 56 of a shape corresponding substantially to that of pockets 54 is adapted to slide in each pocket. This piston is pressure loaded by means of a spring 58 acting between the bottom wall 60 of the pockets and the inner wall of pistons 56. In the embodiment illustrated, a gasket 62 is mounted in a groove provided in wall 54 to limit the stroke of the piston inside the pocket. Hence, this piston will accept the displaced fluid of chamber 22 and will return thereafter to its original position under the action of spring 58.

Referring to FIG. 3, the stroke of the piston is, in this case, limited by a shoulder portion 64 in the interior wall 54.

Figure 4:
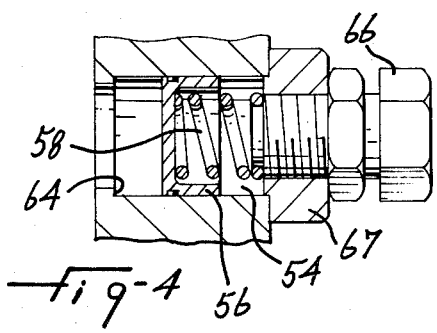

Referring to FIG. 4, the compression of the spring 58 may be adjusted by means of a screw member 66 which is threadedly mounted to an adapter 67 tightly fitted in the bore of pocket 54.

Figure 5:
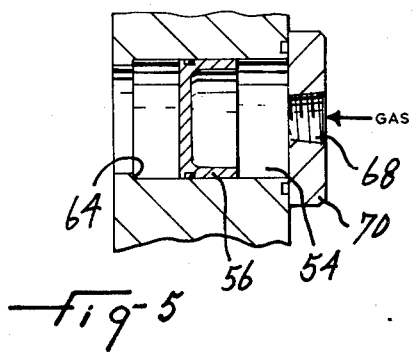

Referring to FIG. 5, the construction shown is somewhat similar to FIG. 3; however, in this case, the spring is no longer present and the force applied on the piston is exerted by a pressurized gas supplied to pocket 54 through a conduit (not shown) adapted to threadedly engage the orifice 68 of a cover adapter 70.

Figure 6:
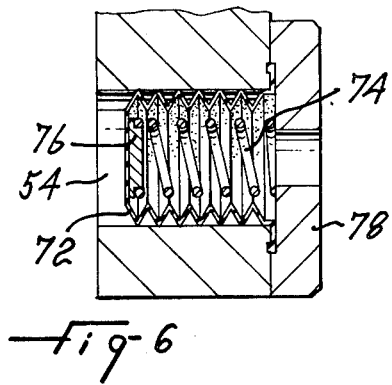

FIG. 6 shows the use of a bellow construction 72 mounted inside pocket 54 and pressure-loaded by means of a spring 74 acting between a bottom element 76 of the bellow and the cover adapter 78. This bellow member 72 may be made of an elastomeric material or of a flexible metal.

Figure 7:
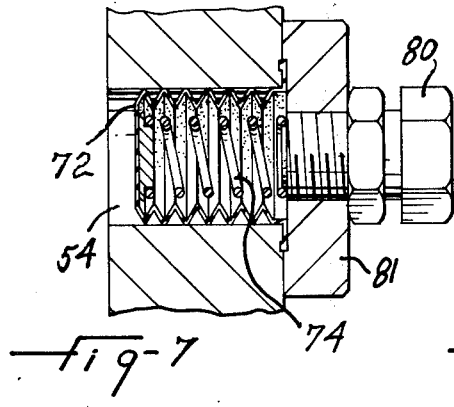

FIG. 7 illustrates a compensator similar to that shown in FIG. 6; however, in this case, spring 74 may be adjusted by a screw member 80 which is threadedly mounted to a cover adapter 81.

Figure 8:
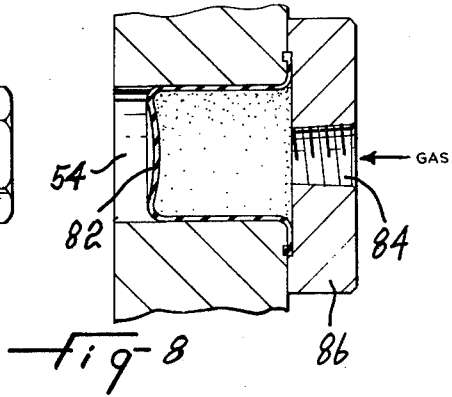

The compensating element illustrated in FIG. 8 consists of an elastomeric cup-shaped member 82 which is pressure-loaded by means of a pressurized gas inserted through the orifice 84 of a cover adapter 86.

Figure 9:
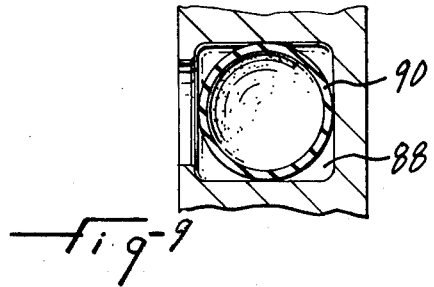

FIG. 9 shows a different type of pocket construction; enclosed pocket 88 contains a gas pressurized elastomeric hollow member 90 which will deform and accept the displaced fluid as explained hereinabove.

Although the invention has been described above with respect to specific forms of the invention, it will be evident to the man skilled in the art that it may be further refined and modified in various ways. It is therefore wished to have it understood that the present invention is not to be limited in interpretation except by the terms of the following claims.

The embodiments of the invention in which an exclusive property or privilege is claimed are defined as follows:

1. In an axial mechanical seal including a housing with an annular inner space containing fluid under pressure, a seal ring and a carrier means supporting said seal ring in said annular space, said seal ring and said carrier means being axially and radially displaceable in said annular space when subjected to heavy vibrations: a series of pockets annularly disposed in said housing; compensator means in each said pocket, said compensator means consisting of resilient yielding means having a portion in contact with said fluid under pressure; said resilient means yielding in said pocket to accept fluid displacement as a result of axial movement of said seal ring and said carrier means in said annular space.

2. In an axial mechanical seal as defined in claim 1, said resilient yielding means consisting of a piston axially displaceable in said pocket and means applying pressure on said piston to return said piston to its original position after having been displaced by said fluid.

3. In an axial mechanical seal as defined in claim 2, said pressure means consisting of a spring.

4. In an axial mechanical seal as defined in claim 3, means for adjusting tension in said spring.

5. In an axial mechanical seal as defined in claim 2, said pressure applying means consisting of pressurized gas arranged exteriorly of said housing and connected to said pocket.

6. In an axial mechanical seal as defined in claim 2, means being provided in said pocket for limiting the return displacement of said piston in said pocket.

7. In an axial mechanical seal as defined in claim 6, said limiting means consisting of a shoulder portion in said pocket.

8. In an axial mechanical seal as defined in claim 6, said limiting means consisting of an annular gasket seated in a groove in the wall of said pocket.

9. In an axial mechanical seal as defined in claim 1, said resilient yielding means consisting of a pressure-loaded elastomeric member.

10. In an axial mechanical seal as defined in claim 9, wherein pressure loading is accomplished by a spring.

11. In an axial mechanical seal as defined in claim 10, means for adjusting compression in said spring.

12. In an axial mechanical seal as defined in claim 9, wherein pressure loading is pneumatic.

13. In an axial mechanical seal as defined in claim 12, wherein said pressure loading is adjustable.

14. In an axial mechanical seal as defined in claim 9, wherein said elastomeric part is in the form of bellow.

15. In an axial mechanical seal as defined in claim 9, said elastomeric part consisting of a gas pressurized hollow body.

16. In an axial mechanical seal as defined in claim 1, said resilient yielding means consisting of a metallic bellow and of a spring inside said metallic bellow for returning said bellow to its original position after fluid displacement.

17. In an axial mechanical seal as defined in claim 16, means for adjusting compression in said spring.

18. In an axial mechanical seal as defined in claim 1, a second series of pockets annularly disposed in said housing; means inside said pockets for returning said seal ring to a sealing engagement after having been axially displaced in said annular space.

* * * * *